United States Patent [19]

Koelfgen

[11] 4,401,563
[45] Aug. 30, 1983

[54] OIL FILTER CARTRIDGE FOR MOTORCYCLES

[76] Inventor: Douglas Koelfgen, 205 N River St., Delano, Minn. 55328

[21] Appl. No.: 401,530

[22] Filed: Jul. 26, 1982

[51] Int. Cl.³ .............................................. B01D 27/10
[52] U.S. Cl. .................................. 210/130; 210/168; 210/416.5; 210/DIG. 17
[58] Field of Search ............ 210/168, 130, 133, 416.5, 210/DIG. 17, 137, 120, 172, 437, 438, 439

[56] References Cited

U.S. PATENT DOCUMENTS

| | | | |
|---|---|---|---|
| 3,042,215 | 7/1962 | Gruner | 210/168 |
| 3,272,336 | 9/1966 | Humbert, Jr. | 210/132 |
| 3,456,800 | 7/1969 | Humbert, Jr. | 210/130 |
| 3,750,888 | 8/1973 | Rinaldo | 210/130 |
| 3,853,763 | 12/1974 | Hall | 210/130 |
| 3,855,128 | 12/1974 | Shaltz et al. | 210/130 |
| 3,883,430 | 5/1975 | Codo | 210/132 |
| 3,957,640 | 5/1976 | Stack | 210/172 |
| 3,970,557 | 7/1976 | Shoup | 210/130 |
| 3,985,652 | 10/1976 | Cooper | 210/168 |
| 4,127,484 | 11/1978 | Walulik et al. | 210/168 |
| 4,354,946 | 10/1982 | Warlick et al. | 210/168 |

Primary Examiner—Charles N. Hart
Assistant Examiner—Wanda L. Millard
Attorney, Agent, or Firm—James R. Cwayna

[57] ABSTRACT

A disposable oil filter cartridge particularly designed for use in and with motorcycle engines wherein the filter is arranged within the oil tank of the engine and including a filter retaining body structure for insertion into the oil tank with spring biasing means normally holding the same within the tank and providing a filter passage area defined by the body and retaining the filter portion of the unit and the body defining a by-pass flow area opening under pressure to permit the oil to flow from the cartridge without passing the same through the filter element. The entire cartridge element is removable from the oil tank and is disposable such that cleaning of the same is eliminated.

4 Claims, 4 Drawing Figures

OIL FILTER CARTRIDGE FOR MOTORCYCLES

FIELD OF THE INVENTION

This invention relates generally to filter devices and more particularly to disposable oil filter cartridges for use in motorcycles and motorcycle engines that include a separate oil tank or reservoir wherein the filter cartridge is positioned within the tank or reservoir for filtering of the oil that has passed through the engine and is normally under pressure when the same is returned to the oil tank or reservoir.

BACKGROUND AND OBJECTS OF THE INVENTION

The present invention is directed to a disposable oil filter cartridge for use with and in motorcycle engines which engine system includes an oil tank or reservoir. Such tank will normally serve as a lubricant reservoir and is arranged separate from the crankcase of the engine with the oil being pumped from the engine to the reservoir or tank and thereafter being drawn from the tank or reservoir for reentry to the engine.

The applicant is aware of the filtering devices that currently exist for such engines and although various disposable filters exist for automobile engines or the like. None of these filters would be usable for motorcycle engines which include an in-tank unit and which provide a pressure relief for permitting the oil to flow from the cartridge or filtering element without passing through the filtering portion.

Such filter units include patents to Hall, U.S. Pat. No. 3,853,763; Rinaldo, U.S. Pat. No. 3,750,888; Stack, U.S. Pat. No. 3,957,640 and Codo, U.S. Pat. No. 3,883,430. A primary difference with the applicant's device and these units is the permission of limited non-filtered flow.

A standard filtering system for a motorcycle engine includes a housing which is receivable into the oil tank and which includes a removable inner core. The changing of the filter requires that this inner core be removed from the housing and the housing be cleaned with a new filter placed therein. This cleaning and replacement is tedious and time consuming and, unless done properly, does not provide for total removal of sediments and dirt within the oil being used or new oil being added and this dirt retention can result in damage to the engine. The automobile engine filters are normally self contained cartridges which are arranged within the oil flow system of the auto and not housed within an oil tank or reservoir. As such, these filters are self contained units with all oil flow being contained therein with a self contained inlet and outlet with the obvious difference being the flow of oil from the applicant's device being directly into a reservoir or tank.

With the applicant's unit, the filter device is received into the tank or reservoir and the normal flow of oil therethrough is received under exhaust engine pressure and the oil is passed through a filter material into the tank or reservoir with the unit including a bypass flow area which will permit flow of oil into the tank or reservoir without passing the same through the filter medium when the back pressure would prevent a positive flow of oil. With the applicant's unit, the cost of the same permits disposal rather than cleaning and replacement and will result in lower labor costs with more effective filtering operation.

It is therefore an object of the applicant's invention to provide a disposable oil filter cartridge which is particularly usable with motorcycle engines or similar engines which employ an oil tank or reservoir.

It is a further object of the applicant's invention to provide a disposable oil filter cartridge having a housing body and a filter medium or element therein with flow passages formed through the periphery of the body to allow flow through the medium and directly outwardly through the body.

It is still a further object of the applicant's invention to provide a disposable oil filter element for utilization with motorcycle engines or the like which engines include an individual oil tank or reservoir wherein the oil received into the tank is under pressure and the filter element includes a pressure relief to allow direct flow of oil into the tank upon a back pressure increase through the filter medium.

These and other objects and advantages of the applicant's invention will appear from a consideration of the accompanying drawings and disclosure.

DESCRIPTION OF A PREFERRED FORM OF THE INVENTION

Figure 1:
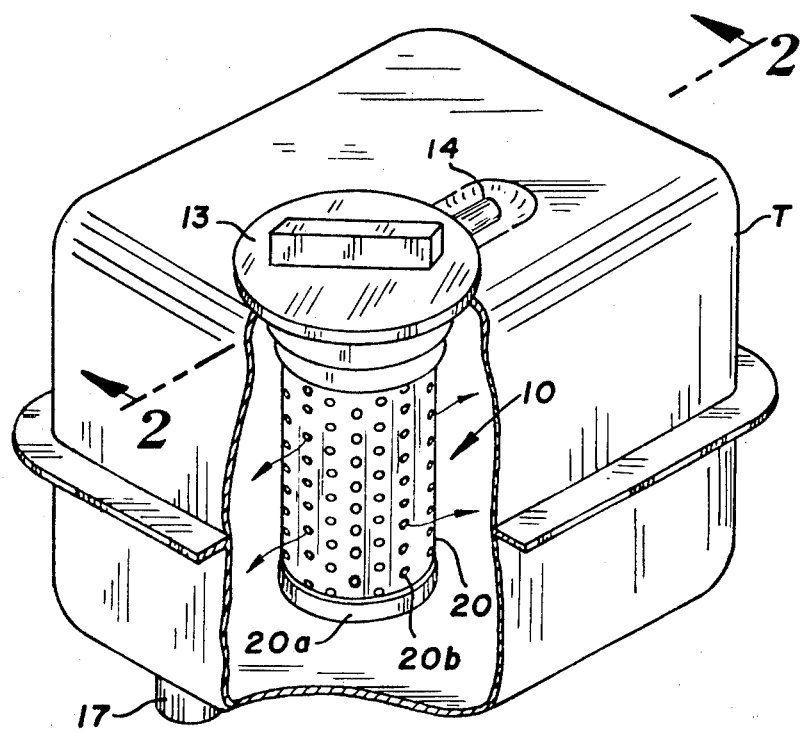
FIG. 1 is a perspective view of a typical oil tank or reservoir normally included with certain representative motorcycles engines and illustrating the same with a portion broken away to illustrate the oil filter cartridge embodying the concept of the applicant's invention therein.
Figure 2:
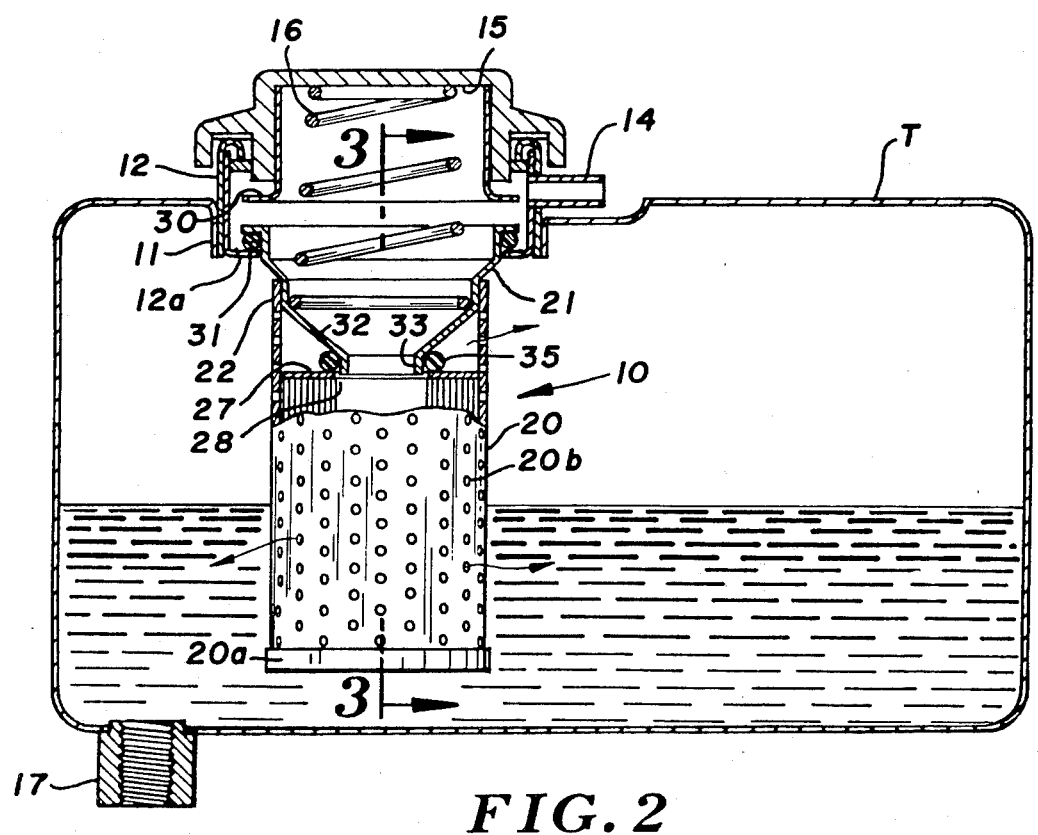
FIG. 2 is a vertical section through the oil tank or reservoir taken substantially along Line 2—2 of FIG. 1.

In accordance with the accompanying drawings, the disposable oil filter device embodying the concepts of the applicant's invention is generally designated 10 and is designed and illustrated in conjunction with the oil tank or reservoir T associated with a Harley-Davidson motorcycle although this tank or reservoir is purely illustrative, the concepts of the invention being similar for any other type of unit which employs the oil tank or reservoir.

The tank or reservoir T, in the form shown, includes an upper surface aperture 11 having a generally C-shaped, inwardly directed element 12 therein to receive a closure cap 13 thereon with the C-shaped element 12 and the closure cap 13 having thread-like interlocks compatible with each other on the mating surfaces thereof. Such capping structure is well known in the art and only those portions of such structure which are important to the location of the filter device 10 will be described hereinafter. As illustrated, however, the C-shaped element 12 is provided with an oil inlet on the periphery thereof, such inlet being designated 14 and the closure cap 13 is provided with a female bore 15 extending upwardly therein to receive a locating and pressure spring 16, the spring being included as a portion of the invention 10, the same being provided to hold and retain the filter unit 10 in position within and against an inwardly directed flange 12a of the C-shaped element 12.

An outlet 17 is provided on the tank T for the flow of filtered oil therefrom to the engine and the logical flow of oil is from the engine (not shown) into the inlet 14 of the C-shaped element 12 and thence downwardly through the filter unit 10 and into the interior of the tank T and subsequently from the outlet 17 back to the engine.

The filter unit 10 includes a body member consisting of two individual members 20, 21 which may be described as a generally circular body member or filter housing member 20 and a conical shaped introduction member 21. These two members 20, 21 are sealingly joined at a common intersection 22 and the filter housing member 20 is provided with a closure cap 20a at the bottom thereof.

The filter housing member 20 is generally circular in shape and is provided with perforations along the periphery thereof to allow the flow of oil therethrough after the same has been filtered or allowed to pass without filtering. Such perforations are designated 20b and are spaced along the housing 20.

Figure 3:
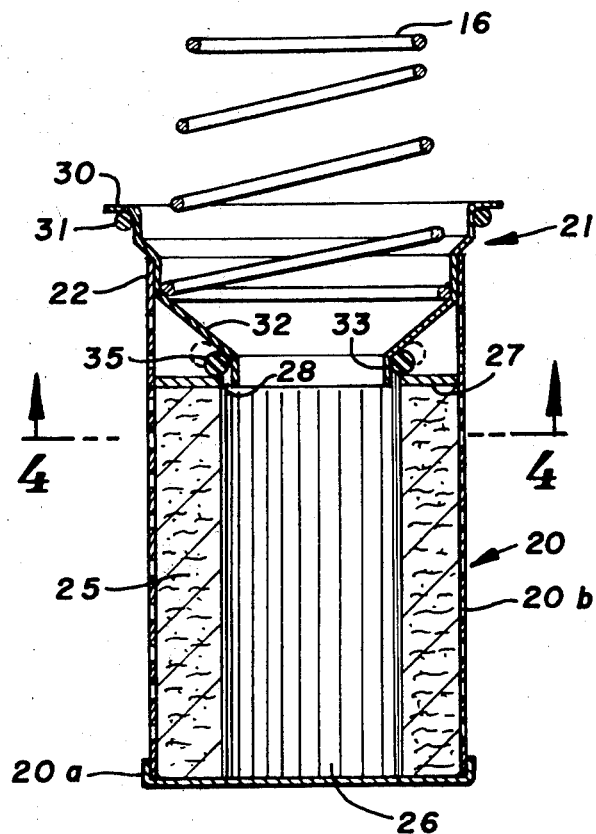
FIG. 3 is a vertical section taken substantially along Line 3—3 of FIG. 2 and illustrating the oil filter cartridge as the same is produced for individual usage; and, FIG. 4 is a horizontal section taken substantially along Line 4—4 of FIG. 3.
Figure 4:
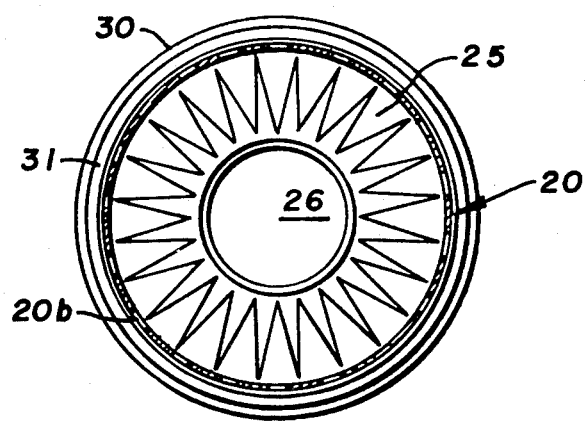

The filter element is designated 25 and is generally circular in shape and, as illustrated in FIG. 4, is of a fan fold pattern being formed in a circular configuration to thus provide a plurality of radially arranged pleats for the flow of oil therethrough. This pattern provides a tortious pattern for the flow of the oil to provide a positive filtering action. The specific filter configuration may be departed from without departing from the scope of the invention but certain aspects of the shape of the filter material are essential. As illustrated, the radially arranged pleats provide a longitudinally extending passage 26 through the filter material and the uppermost end of the filter material 25 provides a seat and sealing surface for a radially extending member 27, such as a washer, or the like having an internal diameter the same as the exterior diameter of the longitudinal passage 26 through the filter material but the member, as particularly illustrated in FIG. 3 has an equal or slightly greater diameter as measured from the center of passage 26 than the conically shaped introduction member 21 at the lower circular portion 33. A gap 28 is therefore provided between such elements and this gap provides a relief passage 28.

The conically shaped introduction member 21 provides a series of stepped and tapered portions. A first, radially extending portion 30 is provided at the uppermost end of the unit 10 and this portion or flange 30 is arranged to overlie the inwardly extending flange 12a of the C-shaped element 12 and an O-ring or similar member is arranged to be positioned below such flange 30 and about the remaining periphery of the introduction member 21 to provide a seal between such outwardly and inwardly directed flanges 12a, 30. Such O-ring being designated 31 and of a resiliency to allow compression and sealing thereof by the spring 16. From flange 30 the conical introduction member 21 is directed inwardly to the common sealing portion 22 and provides a longitudinally extending circular portion for sealing against the interior of the housing 20. A second conical step 32 is arranged continuously therefrom and such step terminates in a generally circular extending portion 33 which, together with the washerlike member 27 provides the relief gap 28. It should be noted that lower portion of the locating spring 16 rests against the upper portion of such second conical step 32 to exert the holddown and locating pressure against the unit 19 and particularly against the sealing element 31.

A relief member, such as an O-ring 35 is positioned on the outer periphery of the conical introduction member 21 adjacent the lower circular portion 33 to normally overlie the relief gap 28. When the pressure within the filter area is sufficient, the pressure will cause such member 35 to move upwardly and outwardly on the second step area 32 thus allowing oil to flow upwardly through the gap 28 and through the perforations of the outer housing. Obviously such relieved oil will not be filtered but the percentage of such oil is minimal as to the filtered oil. The relief member 35 and the accompanying conical step 32 results in automatic replacement of the relief member 35 into sealing position upon the reduction in oil pressure.

The simplicity of the design of the applicant's device allows for the disposability of the same when it has become clogged or excessively dirty and such disposability insures cleanliness of engine oil and speed of maintenance. The further advantage of the applicant's unit is the relief pressure arrangement which eliminates back pressure to the engine oil pump and allows for smooth oil flow which is not obtainable with such filters presently on the market.

What I claim is:

1. An oil filter unit for insertion into and for use with engines that include an oil tank separate from the engine with flow means therebetween and including a receiving aperture in the tank into which the filter may be inserted and a closure cover for such aperture; said filter unit including:
    a. a generally cylindrical, longitudinally extending housing having first and second ends;
    b. said first end of said housing being closed;
    c. perforations formed through said housing and extending substantially the entire longitudinal length thereof;
    d. a filtering member of a length shorter than the longitudinal dimension of said housing and being received therein to receive oil to be filtered and providing a generally central, longitudinal passage for oil flow;
    e. a radially extending closure member arranged on the inner periphery of said housing member and overlying in juxtaposition with said filtering member and having an aperture therethrough in alignment with said central passage of said filtering member;
    f. said apertured closure member being arranged radially within said housing member to provide communication with a plurality of perforations through said housing longitudinally along said filtering member;
    g. a generally conical, oil inlet member secured to the second end of said housing and extending inwardly, longitudinally therefrom having its discharge end positioned within said aperture of said closure member, the diameter thereof being less than the diameter of said aperture to provide an oil flow gap therebetween; and
    h. a generally circular, resilient gap closure member received about said discharge end of said oil inlet member to normally seal the gap between said inlet member and said apertured closure member and being shiftable from said gap upon an increase in oil pressure within said housing to permit oil flow through said gap and through said perforations of said housing above said apertured member into the tank.

2. The structure set forth in claim 1 and said gap closure member including an O-ring.

3. The structure set forth in claim 1 and means for retaining said housing member in said tank, including a spring member associated with the closure cover to normally urge said housing member into the tank.

4. The structure set forth in claim 1 and sealing means arranged between a selected portion of said housing and the tank.

* * * * *